United States Patent
Davin et al.

(10) Patent No.: US 12,258,473 B2
(45) Date of Patent: Mar. 25, 2025

(54) SULFUR-CROSSLINKABLE RUBBER MIXTURE, VULCANIZATE AND VEHICLE TYRE

(71) Applicant: Continental Reifen Deutschland GmbH, Hannover (DE)

(72) Inventors: Julien Davin, Hessisch Oldendorf (DE); Julia Schöffel, Hannover (DE); Fabian Schax, Seelze (DE); Christine Weber, Garbsen (DE); Marion Puppa, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 12 days.

(21) Appl. No.: 18/256,416

(22) PCT Filed: Nov. 8, 2021

(86) PCT No.: PCT/DE2021/200177
§ 371 (c)(1),
(2) Date: Jun. 7, 2023

(87) PCT Pub. No.: WO2022/122089
PCT Pub. Date: Jun. 16, 2022

(65) Prior Publication Data
US 2024/0034861 A1 Feb. 1, 2024

(30) Foreign Application Priority Data
Dec. 8, 2020 (DE) ...................... 10 2020 215 465.1

(51) Int. Cl.
*C08L 9/00* (2006.01)
*C08K 3/36* (2006.01)
*C08K 5/00* (2006.01)
*C08K 5/548* (2006.01)

(52) U.S. Cl.
CPC .................. *C08L 9/00* (2013.01); *C08K 3/36* (2013.01); *C08K 5/0025* (2013.01); *C08K 5/548* (2013.01); *C08L 2203/00* (2013.01); *C08L 2312/08* (2013.01)

(58) Field of Classification Search
CPC ...... C08L 9/00; C08L 9/06; C08L 7/00; C08L 2312/08; C08K 5/0025; C08K 5/548
USPC .................. 252/511; 524/525, 526
See application file for complete search history.

(56) References Cited

U.S. PATENT DOCUMENTS

| | | | |
|---|---|---|---|
| 5,580,919 A * | 12/1996 | Agostini | C08K 5/548 524/495 |
| 5,914,364 A | 6/1999 | Cohen et al. | |
| 10,479,880 B2 | 11/2019 | Tokimune et al. | |
| 2002/0019473 A1 | 2/2002 | Kayser et al. | |
| 2004/0129360 A1 | 7/2004 | Vidal | |
| 2010/0108239 A1 | 5/2010 | Recker et al. | |
| 2018/0112065 A1 | 4/2018 | Tokimune et al. | |
| 2019/0375920 A1 | 12/2019 | Tsuchida | |
| 2019/0390042 A1 | 12/2019 | Kunisawa | |
| 2020/0130306 A1 * | 4/2020 | Kramer | C08L 7/00 |
| 2020/0377702 A1 * | 12/2020 | Schoeffel | C08K 5/548 |
| 2021/0230403 A1 * | 7/2021 | Blok | B60C 11/0008 |

FOREIGN PATENT DOCUMENTS

| | | | |
|---|---|---|---|
| DE | 19916498 A1 | 10/2020 | |
| EP | 0864605 A2 | 6/1999 | |
| EP | 1061097 A1 | 2/2002 | |
| EP | 2233317 A1 * | 9/2010 | ........... B60C 1/0016 |
| EP | 2746327 B1 | 4/2017 | |
| EP | 3321109 A1 | 5/2018 | |
| EP | 3428225 A1 | 1/2019 | |
| EP | 3312232 A1 | 11/2019 | |
| EP | 3567077 A1 | 12/2019 | |
| EP | 3567078 A1 | 12/2019 | |
| JP | 2000239449 A | 9/2000 | |
| JP | 2006502270 A | 1/2006 | |
| JP | 2018065954 A | 4/2018 | |
| KR | 20180015361 A | 2/2018 | |
| WO | 2018143111 A1 | 8/2018 | |
| WO | 2019226843 A1 | 11/2019 | |

OTHER PUBLICATIONS

Notice of Reasons for Refusal drafted on Mar. 18, 2024 for the counterpart Japanese Patent Application No. 2023-532131 and machine translation of same.
International Search Report dated Feb. 1, 2022 of International Application PCT/DE2021/200177 on which this application is based.

* cited by examiner

*Primary Examiner* — Tri V Nguyen
(74) *Attorney, Agent, or Firm* — Richard A. Wolf; Gregory Adams

(57) ABSTRACT

The invention relates to a sulfur-crosslinkable rubber mixture, to a vulcanizate and to a vehicle tire.
The sulfur-crosslinkable rubber mixture contains at least the following constituents:
  50 to 100 phr of at least one polyisoprene selected from the group consisting of natural and synthetic polyisoprene and
  5 to 500 phr of at least one silica and
  at least one silane B having the general empirical formula I)

$$(R^1)_oSi-R^2-S_n-R^2-Si(R^1)_o$$

where the $R^2$ radicals may independently be the same or different and are unbranched alkylene groups having 6 to 20 carbon atoms, preferably 6 to 10 carbon atoms,
  and where n is an integer from 2 to 10.

16 Claims, No Drawings

SULFUR-CROSSLINKABLE RUBBER MIXTURE, VULCANIZATE AND VEHICLE TYRE

The invention relates to a sulfur-crosslinkable rubber mixture, to the vulcanizate thereof and to a vehicle tire.

To a high degree, the rubber mixtures of the different components determine the driving properties and service life of a vehicle tire. At the same time, the internal tire components or mixtures thereof, also referred to as body mixtures, likewise affect the durability and service life of the tire, as does the tread that comes into contact with the road. As is well known, the internal tire components also include those that comprise strength members for reinforcement, such as the belt plies. These strength members are ensheathed and hence rubberized by one or more rubber mixtures. The corresponding rubber mixtures are also referred to as rubberizing mixtures.

Such a rubberizing mixture is disclosed, for example, in EP 2746327 B1.

In the rubberizing mixtures, as is generally also the case for internal tire components, crucial factors include heat buildup and durability on account of stresses in driving operation.

It is an object of the present invention to provide a rubber mixture, especially for internal tire components and especially for ensheathing of strength members, that features lower and hence improved heat buildup and improved tear properties. At the same time, the rubber mixture is to have better processability.

The object is achieved by a rubber mixture comprising the following components:

50 to 100 phr of at least one polyisoprene selected from the group consisting of natural and synthetic polyisoprene and 5 to 500 phr of at least one silica and at least one silane B having the general empirical formula I)

$$(R^1)_o Si-R^2-S_n-R^2-Si(R^1)_o \qquad I)$$

where the two o may independently be the same or different and each assume a value of 1, 2 or 3 and the $R^1$ radicals may independently be the same or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or alkyl polyether groups $-O-(R^6-O)_r R^5$ where $R^6$ are the same or different and are branched or unbranched, saturated or unsaturated, aliphatic, aromatic or mixed aliphatic/aromatic bridging $C_1$-$C_{30}$ hydrocarbon groups, preferably $-CH_2-CH_2-$, r is an integer from 1 to 30, preferably 3 to 10, and $R^5$ is unsubstituted or substituted, branched or unbranched, terminal alkyl, alkenyl, aryl or aralkyl groups, preferably $-C_{13}H_{27}$ alkyl group, or two $R^1$ form a cyclic dialkoxy group having 2 to 10 carbon atoms, in which case o<3, or two or more silanes of formula I) may be bridged via $R^1$ radicals, and under the condition that, in formula I), in each $(R^1)_o Si-$ group, at least one $R^1$ is selected from those options mentioned above in which this $R^1$ i) is bonded to the silicon atom via an oxygen atom or ii) is a halide, and the $R^2$ radicals may independently be the same or different and are unbranched alkylene groups having 6 to 20 carbon atoms, preferably 6 to 10 carbon atoms, and where n is an integer from 2 to 10.

It has been found that, surprisingly, the combination of the constituents mentioned can achieve an improvement in heat buildup and friction properties.

The present invention further provides a vulcanizate of at least one rubber mixture of the invention.

The present invention further provides a vehicle tire including at least one inventive vulcanizate of the rubber mixture of the invention in at least one component.

The vehicle tire of the invention preferably includes the vulcanizate of the invention especially as a rubberizing mixture, especially as steel cord rubberization and/or belt rubberization, and/or in the sidewall and/or in the tread and/or in another tire component, such as a belt cushion in particular.

In advantageous embodiments of the invention, the vehicle tire includes at least one vulcanizate of the invention at least in an internal component, such as, in particular, as rubberization mixture, such as, in particular, as belt rubberization, and/or as belt cushion.

However, the rubber mixture of the invention is likewise suitable in principle for the sidewall and/or the tread.

The vulcanizate of the invention and the vehicle tire of the invention especially feature improved durability and service life.

Vehicle tires in the context of the present invention are understood to mean pneumatic vehicle tires and all-rubber tires, including tires for industrial and construction site vehicles, truck tires, car tires and bicycle tires.

The rubber mixture of the invention is additionally also suitable for other industrial rubber articles, such as bellows, conveyor belts, air springs, belts, drive belts or hoses, and footwear soles.

There follows a detailed description of the constituents of the sulfur-crosslinkable rubber mixture of the invention. All remarks also relate to the vulcanizate of the invention and the vehicle tire of the invention that includes at least one inventive vulcanizate of the rubber mixture of the invention in at least one component.

The invention encompasses all advantageous configurations reflected in the claims or elsewhere. More particularly, the invention also encompasses configurations that result from combination of different features, for example of constituents in the rubber mixture, different levels of preference of these features, such that a combination of a first feature described as "preferred" or feature described in the context of an advantageous embodiment with a further feature described, for example, as "particularly preferred" is encompassed by the invention, unless the opposite is apparent for technical reasons or from the content.

The unit phr (parts per hundred parts of rubber by weight) used in this document is the unit of amount customary in the rubber industry for mixture formulations. The dosage of the parts by weight of the individual substances in this document is based on 100 parts by weight of the total mass of all rubbers present in the mixture that have a molecular weight $M_w$ by GPC of greater than 20 000 g/mol.

The unit phf (parts per hundred parts of filler by weight) used in this document is the unit of amount customary in the rubber industry for coupling agents for fillers.

In the context of the present application, phf relates to the silica present, meaning that any other fillers present, such as carbon black, are not included in the calculation of the amount of silane.

The rubber mixture of the invention contains 50 to 100 phr, preferably 70 to 100 phr, more preferably 75 to 100 phr, of at least one polyisoprene selected from natural (NR) and synthetic polyisoprene (IR).

The polyisoprene(s) preferably have a weight-average molecular weight Mw by GPC of 250 000 to 5 000 000 g/mol.

The natural and/or synthetic polyisoprene in all embodiments may be either cis-1,4-polyisoprene or 3,4-polyisoprene. Preference is given, however, to the use of cis-1,4-polyisoprenes having a cis-1,4 content of >90% by weight. Firstly, such a polyisoprene can be obtained by stereospecific polymerization in solution with Ziegler-Natta catalysts or using finely divided lithium alkyls. Secondly, natural rubber (NR) is a cis-1,4-polyisoprene in which the cis-1,4 content in the natural rubber is greater than 99% by weight.

In addition, a mixture of one or more natural polyisoprenes with one or more synthetic polyisoprene(s) is also conceivable.

In the context of the present invention, the term "natural rubber" is understood to mean naturally occurring rubber that can be obtained from Hevea rubber trees and "non-Hevea" sources. Non-Hevea sources are, for example, Guayule bushes and dandelions, for example TKS (Taraxacum kok-saghyz; Russian dandelion).

If the rubber mixture contains less than 100 phr NR and/or IR, it contains at least one further diene rubber.

Diene rubbers refer to rubbers that are formed by polymerization or copolymerization of dienes and/or cycloalkenes and hence have C=C double bonds either in the main chain or in the side groups.

The further diene rubber here is preferably selected from the group consisting of epoxidized polyisoprene, butadiene rubber (BR), butadiene-isoprene rubber, solution-polymerized styrene-butadiene rubber (SSBR), emulsion-polymerized styrene-butadiene rubber (ESBR), styrene-isoprene rubber, liquid rubbers having a molecular weight $M_w$ of greater than 20 000 g/mol, halobutyl rubber, polynorbornene, isoprene-isobutylene copolymer, ethylene-propylene-diene rubber, nitrile rubber, chloroprene rubber, acrylate rubber, fluoro rubber, silicone rubber, polysulfide rubber, epichlorohydrin rubber, styrene-isoprene-butadiene terpolymer, hydrogenated acrylonitrile-butadiene rubber and hydrogenated styrene-butadiene rubber.

Especially nitrile rubber, hydrogenated acrylonitrile-butadiene rubber, chloroprene rubber, butyl rubber, halobutyl rubber or ethylene-propylene-diene rubber are used in the production of industrial rubber articles, such as belts, drive belts and hoses, and/or footwear soles. The mixture compositions employed here with preference are those that are known to the person skilled in the art for these rubbers—particularly with regard to fillers, plasticizers, vulcanization systems and admixtures.

In advantageous embodiments, the further diene rubber, especially in the case of use of the rubber mixture in vehicle tires, is selected from the group consisting of butadiene rubber (BR), solution-polymerized styrene-butadiene rubber (SSBR), emulsion-polymerized styrene-butadiene rubber (ESBR), butyl rubber (IIR) and halobutyl rubber.

In an advantageous embodiment of the invention, the rubber mixture contains 75 to 99 phr NR and 1 to 25 phr BR, preferably 75 to 85 phr NR and 15 to 25 phr BR, for example and especially 80 phr NR and 20 phr BR.

Such a rubber mixture is of particularly good suitability as rubberizing mixture, especially as belt rubberization, with particularly good achievement of the object underlying the invention.

According to the invention, the rubber mixture contains 5 to 500 phr of at least one silica.

The silica may be of the silica types known to the person skilled in the art that are suitable as filler for tire rubber mixtures. It is particularly preferable, however, when a finely divided, precipitated silica is used that has a nitrogen surface area (BET surface area) (to DIN ISO 9277 and DIN 66132) of 35 to 400 $m^2/g$, preferably of 35 to 350 $m^2/g$, more preferably of 85 to 320 $m^2/g$ and most preferably of 120 to 235 $m^2/g$, and a CTAB surface area (to ASTM D 3765) of 30 to 400 $m^2/g$, preferably of 30 to 330 $m^2/g$, more preferably of 80 to 300 $m^2/g$ and most preferably of 110 to 230 $m^2/g$. In rubber mixtures for tire treads, for example, such silicas lead to particularly good physical properties of the vulcanizates. Moreover, advantages may arise in mixture processing through a decrease in the mixing time for the same product properties, which lead to an improvement in productivity. Silicas used may thus, for example, be those of the Ultrasil® VN3 type (trade name) from Evonik and finely divided silicas, called HD silicas (e.g. Zeosil® 1165 MP from Solvay).

In a preferred embodiment of the invention, the rubber mixture of the invention contains 20 to 300 phr, preferably 20 to 250 phr, more preferably 40 to 150 phr and even more preferably 40 to 100 phr, more preferably again 50 to 70 phr, of at least one silica.

If at least two different silicas that differ in terms of BET surface area, for example, are present in the rubber mixture of the invention, the stated amounts mentioned are always based on the total amount of all silicas present.

The rubber mixture of the invention may further comprise at least one carbon black, especially an industrial carbon black.

Useful carbon blacks include all carbon black types known to the person skilled in the art.

In one embodiment, the carbon black has an iodine number to ASTM D 1510, also referred to as iodine adsorption number, between 30 and 250 g/kg, preferably 30 to 180 g/kg, more preferably 40 to 180 g/kg, and most preferably 40 to 130 g/kg, and a DBP number to ASTM D 2414 of 30 to 200 ml/100 g, preferably 70 to 200 ml/100 g, more preferably 90 to 200 ml/100 g.

The DBP number to ASTM D 2414 stipulates the specific absorption volume of a carbon black or light-colored filler by means of dibutyl phthalate.

The use of such a carbon black type in the rubber mixture, especially for vehicle tires, assures the best possible compromise between abrasion resistance and heat buildup, which in turn affects rolling resistance, which is of environmental relevance. It is preferable here when just one carbon black type is used in the respective rubber mixture, but it is also possible to mix different carbon black types into the rubber mixture. The total amount of carbon blacks present is preferably 0 to 250 phr.

In an advantageous embodiment of the invention, the rubber mixture contains 0 to 20 phr, preferably 0 to 10 phr, of at least one carbon black and 40 to 500 phr, preferably 40 to 100 phr, of at least one silica.

The rubber mixture of the invention may preferably contain minimum amounts, i.e. preferably 0 to 20 phr, more preferably 0 to 10 phr, of further fillers. The further (non-reinforcing) fillers in the context of the present invention include aluminosilicates, kaolin, chalk, starch, magnesium oxide, titanium dioxide or rubber gels, and fibers (for example aramid fibers, glass fibers, carbon fibers, cellulose fibers).

Further reinforcing or non-reinforcing fillers are, for example, carbon nanotubes ((CNTs) including discrete CNTs, what are called hollow carbon fibers (HCF) and modified CNTs containing one or more functional groups, such as hydroxy, carboxy and carbonyl groups), graphite and graphenes, and what is called "carbon-silica dual-phase filler".

In the context of the present invention, zinc oxide is not included among the fillers.

According to the invention, the rubber mixture contains at least one silane B having the general empirical formula I)

$(R^1)_o Si\text{—}R^2\text{—}S_n\text{—}R^2\text{—}Si(R^1)_o$  I)

with the definitions above.

The at least one silane B present in accordance with the invention, by virtue of the $S_n$ group and by virtue of n being at least 2, is a silane that can bind to polymers by means of the sulfur group $S_n$. n here is an integer from 2 to 10, preferably 2 to 8, more preferably 2 to 6, and there may also be a mixture of different molecules with different values of n.

Most preferably, n is an integer from 2 to 4.

In a particularly advantageous embodiment of the invention, n is 2.

In a further particularly advantageous embodiment of the invention, n is 4.

It is essential to the invention, moreover, that the $R^2$ radicals may independently be the same or different and are unbranched alkylene groups having 6 to 20 carbon atoms, preferably 6 to 10 carbon atoms.

It has been found that, surprisingly, the object underlying the invention is achieved by an extension of the $R^2$ radicals of, in particular, propyl having three carbon atoms, as in silanes such as TESPD (3,3'-bis(triethoxysilylpropyl) disulfide) or TESPT (3,3'-bis(triethoxysilylpropyl) tetrasulfide), to 6 to 20 carbon atoms.

More preferably, $R^2$ is the same on either side, and is in turn preferably a —$(CH_2)_8$— group.

All the $R^1$ radicals and bridges of one or more silanes via $R^1$ radicals that have been mentioned may be combined with one another within a silyl group.

If two $R^1$ correspond to a dialkoxy group having 2 to 10 carbon atoms and then o<3 (o is less than three), the silicon atom is part of a ring system.

If two silanes of formula I) are bridged to one another, they share one $R^1$ radical, or are joined to one another via an oxygen atom through combination of two Si—$R^1$— groups. In this way, it is also possible for more than two silanes to be joined to one another. After the synthesis of the silane of formula I), it is thus conceivable that two silanes of formula I) are bridged to one another via an oxygen atom or the $R^1$ radicals. In this way, it is also possible for more than two silanes to be joined to one another, for example via dialkoxy groups.

The rubber mixture of the invention may thus also contain oligomers that form through hydrolysis and condensation or by bridging by means of dialkoxy groups as $R^1$ of the silanes B.

The silane of formula I), by virtue of the condition that, in each $(R^1)_o Si$— group, at least one $R^1$ is selected from those abovementioned options in which this $R^1$ i) is bonded to the silicon atom via an oxygen atom or ii) is a halide, comprises at least one $R^1$ radical in each $(R^1)_o Si$— group that can serve as leaving group.

More particularly, these are thus alkoxy groups, phenoxy groups or any other of the groups mentioned that are bonded to the silicon atom by an oxygen atom, or halides.

It is preferable that the $R^1$ radicals comprise alkyl groups having 1 to 10 carbon atoms or alkoxy groups having 1 to 10 carbon atoms or halides; particular preference is given to alkoxy groups having 1 to 6 carbon atoms.

Preferably, in each $(R^1)_o Si$— group, at least one $R^1$ is an alkoxy group having 1 to 10 carbon atoms, more preferably having 1 to 6 carbon atoms.

Preferably, o is 3 on either side of the molecule.

In a particularly advantageous embodiment of the invention, the $R^1$ radicals within a silyl group $(R^1)_o Si$— are the same and are alkoxy groups having 1 to 3 carbon atoms, preferably in turn 1 or 2 carbon atoms, i.e. methoxy groups or ethoxy groups, most preferably ethoxy groups, where o is 3.

But it is also the case for oligomers, or in the case that two $R^1$ form a dialkoxy group, that the other $R^1$ radicals are preferably alkyl groups having 1 to 6 carbon atoms or halides or alkoxy groups having 1 to 6 carbon atoms, preferably one or two carbon atoms, i.e. methoxy groups or ethoxy groups, most preferably ethoxy groups.

In the context of the present invention, ethoxy groups are shown in abbreviated form as EtO or OEt in the formulae of the silanes. The two notations illustrate that alkoxy groups, such as ethoxy groups, are bonded to the silicon atom Si via the oxygen atom O.

In principle, however, the abbreviations OEt and EtO may be used synonymously in the context of the present invention.

In a preferred embodiment of the invention, the silane B has the following structure of formula II):

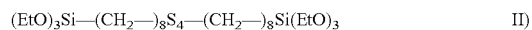

$(EtO)_3 Si\text{—}(CH_2\text{—})_8 S_4\text{—}(CH_2\text{—})_8 Si(EtO)_3$  II)

where EtO represents ethoxy group.

In a further preferred embodiment of the invention, the silane B has the following structure of formula III):

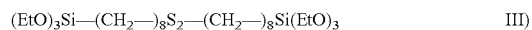

$(EtO)_3 Si\text{—}(CH_2\text{—})_8 S_2\text{—}(CH_2\text{—})_8 Si(EtO)_3$  III)

where EtO represents ethoxy group.

Especially with silanes of the formula II) and/or III), the object underlying the invention is achieved in a particularly efficient manner.

The silane of formula III) is disclosed, for example, in EP 3567078 A1 or EP 3312232 A1. It is prepared in particular according to the method in paragraph [0097] in conjunction with paragraph [0095] of EP 3567078 A1, using 1 mol of sulfur.

The silane of formula II) is prepared analogously and in particular by, in the preparation according to [0095] of EP 3567078 A1, using sulfur in an amount of 3 mol rather than 1.2 mol.

It is also conceivable that the rubber mixture of the invention contains a mixture of two silanes of the formula I), for example the silane of formula II) with the silane of formula III).

The total amount of silanes B covered by the formula I) that are present is preferably 0.1 to 30 phf, preferably 0.5 to 20 phf, more preferably 0.5 to 15 phf.

Especially the preferred and particularly preferred amounts and developments or embodiments result in improved processability and improved properties with regard to heat buildup and tear properties.

The silane(s) B present in accordance with the invention may have been applied to a support, for example wax, polymer or carbon black, and may have been added to the rubber mixture in that form. The silane(s) B present in accordance with the invention may have been applied to a silica, in which case the binding may have been by physical or chemical means.

The application of the silanes B present in accordance with the invention to silica reduces, for example, the output of volatile by-products, such as ethanol in the case of use of ethoxy-substituted silanes ($R^1$=ethoxy).

It is further conceivable that the rubber mixture of the invention contains at least one further silane coupling agent that is not a silane B.

In addition, the rubber mixture may contain further activators and/or agents for the binding of fillers, especially carbon black. These may be, for example, the compound S-(3-aminopropyl)thiosulfuric acid disclosed in EP 2589619 A1 and/or metal salts thereof, which results in very good physical properties of the rubber mixture, especially in the case of combination with at least one carbon black as filler.

The rubber mixture of the invention, in preferred embodiments, is designed for ensheathing (rubberizing) of strength members. For this purpose, it preferably contains a bonding system for binding of the rubber mixture to textile or metallic strength members.

According to whether the mixture is to be used for textile or metallic strength members, either a bonding system for rubber-textile adhesion or a bonding system for rubber-metal adhesion is employed.

Preferably, the bonding system is a steel cord bonding system based on a cobalt compound, especially selected from organic cobalt salts, and reinforcer resins and more than 2.5 phr of sulfur. If such mixtures are in contact with metallic strength members, the improvement in adhesion and in cracking characteristics has a particularly positive effect since the metallic strength members are subject to increased corrosion in the event of loss of bonding and cracking, which significantly impairs the lifetime of the elastomer products, especially pneumatic vehicle tires.

The organic cobalt salts are typically used in amounts of 0.1 to 3 phr. Cobalt salts used may, for example, be cobalt stearate, borate, borate alkanoates, naphthenate, rhodinate, octoate, adipate etc.

Reinforcer resins used may be resorcinol-formaldehyde resins, for example resorcinol-hexamethoxymethylmelamine resins (HMMM) or resorcinol-hexamethylenetetramine resins (HEXA), or modified phenolic resins, for example Alnovol® grades. It is also possible to use the precondensates of the resorcinol resins.

The rubber mixture of the invention preferably contains 2.5 to 8 phr of sulfur, more preferably 3 to 8 phr of sulfur.

In advantageous embodiments of the invention, the rubber mixture contains 3.5 to 5 phr of sulfur.

In advantageous embodiments of the invention, the rubber mixture contains a steel cord bonding system based on organic cobalt salts and reinforcer resins and more than 2.5 phr, especially 3 to 6 phr, of sulfur. The above remarks are applicable to the cobalt salts and reinforcer resins.

In addition, the rubber mixture may contain customary additions in customary portions by weight that are preferably added in at least one base mixing stage in the course of production thereof. These additions include a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, for example zinc oxide and fatty acids (e.g. stearic acid) and/or other activators, such as zinc complexes, for example zinc ethylhexanoate, c) waxes, d) hydrocarbon resins such as, if appropriate, in particular tackifying resins, e) masticating aids, for example 2,2'-dibenzamidodiphenyl disulfide (DBD) and f) process auxiliaries such as, in particular, fatty acid esters and metal soaps, for example zinc soaps and/or calcium soaps, g) plasticizers.

The plasticizers used in the context of the present invention include all plasticizers known to the person skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL), preferably having a polycyclic aromatics content of less than 3% by weight by method IP 346, or triglycerides, for example rapeseed oil, or factices or hydrocarbon resins or liquid polymers having an average molecular weight (determination by GPC=gel permeation chromatography, in accordance with BS ISO 11344:2004) between 500 and 20 000 g/mol. If additional liquid polymers are used as plasticizers in the rubber mixture of the invention, these are not included as rubber in the calculation of the composition of the polymer matrix.

The plasticizer is preferably selected from the group consisting of the abovementioned plasticizers.

The plasticizer is more preferably selected from the group consisting of hydrocarbon resins, liquid polymers and mineral oils.

When mineral oil is used, it is preferably selected from the group consisting of DAE (distillate aromatic extracts) and/or RAE (residual aromatic extract) and/or TDAE (treated distillate aromatic extracts) and/or MES (mild extracted solvents) and/or naphthenic oils.

In a preferred embodiment of the invention, the rubber mixture contains at least one mineral oil plasticizer, preferably at least TDAE and/or RAE as plasticizer. This results in particularly good processabilities, especially good miscibility of the rubber mixture.

In a preferred embodiment of the invention, the rubber mixture contains at least one liquid polymer as plasticizer.

In a preferred embodiment of the invention, the rubber mixture contains at least one hydrocarbon resin as plasticizer.

It will be clear to the person skilled in the art that hydrocarbon resins are polymers formed from monomers, wherein the hydrocarbon resin is formally constructed from derivatives of the monomers through the linkage of the monomers to one another. However, these hydrocarbon resins in the context of the present invention are not counted among the rubbers. The term "hydrocarbon resins" in the context of the present application includes resins that have carbon atoms and hydrogen atoms and may optionally have heteroatoms such as, in particular, oxygen atoms. The hydrocarbon resin may be a homopolymer or a copolymer.

The proportion of further additions in the total amount is 3 to 150 phr, preferably 3 to 100 phr and more preferably 5 to 80 phr.

The total proportion of the further additions may include zinc oxide (ZnO).

This may be any of the types of zinc oxide known to the person skilled in the art, for example ZnO granules or powder. Conventionally used zinc oxide generally has a BET surface area of less than 10 m²/g. It is alternatively possible to use a zinc oxide having a BET surface area of 10 to 100 m²/g, for example what are called "nano-zinc oxides".

In advantageous embodiments of the invention, the rubber mixture contains 1 to 10 phr, preferably 3 to 10 phr, more preferably 7 to 9 phr, of zinc oxide.

The vulcanization is preferably conducted in the presence of sulfur and/or sulfur donors and with the aid of vulcanization accelerators, where some vulcanization accelerators may simultaneously act as sulfur donors.

Sulfur and/or further sulfur donors and one or more accelerators are added to the rubber mixture in the last mixing step. The accelerator here is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to the use of at least one sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenemorpholide (MBS) and/or N-tert-butyl-2-benzothiazylsulfenamide (TBBS).

In preferred embodiments of the invention, the rubber mixture contains DCBS as accelerator. Owing to the comparatively slow reaction kinetics, this is found to be particularly advantageous for the steel cord adhesion of the rubber mixture.

Sulfur donor substances used here may be any of the sulfur donor substances known to the person skilled in the art. If the rubber mixture contains a sulfur donor substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis (O,O-2-ethylhexyl-thiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

It is also possible to use further network-forming systems, as obtainable, for example, under the Vulkuren®, Duralink® or Perkalink® trade names, or network-forming systems as described in WO 2010/049216 A2 in the rubber mixture. This system contains a vulcanizing agent that crosslinks with a functionality greater than four and at least one vulcanization accelerator.

The rubber mixture of the invention is used for production of vehicle tires, and for production of drive belts, belts and hoses.

More particularly, the rubber mixture serves for production of at least one internal component of a vehicle tire. The vehicle tire may be any of the conceivable tire types in which strength members are used.

A further aspect of the invention is a strength member ensheathed with the rubber mixture of the invention.

All the above remarks are applicable to the constituents of the rubber mixture of the invention.

The strength member of the invention is preferably constructed from at least one steel.

The rubber mixture of the invention is especially a steel cord rubberization mixture, resulting in the advantages associated with the invention in the case of good adhesion of the rubber mixture to steel.

The strength member made of steel may in principle be any strength member made of steel that is known to the person skilled in the art. In this context, it is possible for the person skilled in the art to choose the construction of the strength member and their strength class in particular.

The rubber mixture is produced by the method customary in the rubber industry, in which a base mixture having all the constituents except the vulcanization system (sulfur and vulcanization-influencing substances) is first produced in one or more mixing stages. Adding the vulcanization system in a last mixing stage produces the ready-to-use mixture.

In the case of a rubberization mixture, the strength member is partly or fully ensheathed with the rubber mixture of the invention. This is accomplished by calendering the rubber mixture, in which thin sheets are produced from the rubber mixture, which are placed onto the top and bottom of the strength member. The rubber mixture penetrates here onto and into the strength members. After cutting to size, these strength members endowed with the rubber mixture, as known to the person skilled in the art, are used further for production of the end products required.

The rubber mixture of the invention for use as tread, sidewall or other body mixture in vehicle tires is produced as already described. The difference lies in the shaping of the extrusion operation or the calendering of the mixture. The shapes of the as yet unvulcanized rubber mixture that are thus obtained for one or more different body mixtures, sidewall or tread then serve for the construction of a tire blank.

The invention is now to be illustrated in detail by comparative and working examples that are collated in table 1.

The inventive rubber mixture (E1) and comparative mixture (V1) are each rubberization mixtures for steel cords.

The stated amount of the silanes in phf relates to 60 phr of silica.

In the case of E1 versus V1, there was equimolar exchange of the silane, which results in different amounts in phf.

The mixture was otherwise produced by the method customary in the rubber industry under standard conditions in three stages in a laboratory mixer of capacity 300 milliliters to 3 liters, in which, in the first mixing stage (base mixing stage), all constituents apart from the vulcanization system (sulfur and vulcanization-influencing substances) were first mixed at 145 to 165° C., target temperatures of 152 to 157° C., for 200 to 600 seconds. In the second stage, the mixture from stage 1 was mixed once again, performing what is called a "remill". Addition of the vulcanization system in the third stage (ready-mix stage) produced the finished mixture, with mixing at 90 to 120° C. for 180 to 300 seconds.

All the mixtures were used to produce test specimens by vulcanization after $t_{95}$ to $t_{100}$ (measured using a moving die rheometer to ASTM D 5289-12/ISO 6502) under pressure at 160° C. to 170° C., and these test specimens were used to ascertain material properties typical for the rubber industry by the test methods specified below.

Mooney viscosity (Visc.) (ML 1+4) 100° C. to ASTM D 1646 (2004)

resilience at room temperature (RT) to DIN 53 512 and ISO 4662 tensile strength and elongation at break at 100° C. to DIN 53 504 maximum loss factor tan d, synonymous with tan b max., and dynamic storage modulus E' at 55° C. and 100° C. from dynamic mechanical measurement to DIN 53 513, strain sweep at 0.15% and 8% elongation adhesion (rubber coverage at room temperature RT, mean) and pullout force (mean) to ASTM D2229-10, cord used: 1+5*0.4 HT (high tensile)

The figures for tensile strength at 100° C., elongation at break at 100° C., pullout force and coverage are each given in performance percentages, with the performance for V1 normalized to 100% in each case.

Substances Used a) silica: Hi-Sil EZ 160G, PPG
b) process auxiliary and plasticizer: oil and hydrocarbon resin (plasticizer resin)
c) II) $(EtO)_3Si-(CH_2-)_8S_4-(CH_2-)_8Si(EtO)_3$, prepared according to of EP 3567078 A1, using sulfur in an amount of 3 mol rather than 1.2 mol
d) cobalt salt: Co borate alkanoate, 22.5% by weight of cobalt As apparent from table 1, with the inventive rubber mixture E1 containing a silane B) compared to V1 containing TESPT, lower heat buildup is achieved, recognizable by the lower values for hysteresis loss tan d max. at 55° C. and the increase in resilience. At the same time, tear properties, especially tensile strength and elongation at break, are improved at 100° C.

One reason for this could be the filler dispersion that has been improved in E1, which can be identified by the reduced Payne effect (see E'(0.15%)-E'(8%) DKF 55° C.)).

The properties mentioned at the elevated temperatures are particularly relevant and meaningful in respect of durability in spite of stresses in driving operation, since the internal tire components in particular (can) heat up proceeding from ambient temperature in driving operation.

Moreover, E1 has reduced Mooney viscosity and hence better processability. At the same time, steel cord adhesion is not adversely affected, as apparent from pullout force and coverage.

A vehicle tire that includes at least one rubber mixture of the invention in at least one component, especially in an internal component and, for example and in particular, as belt rubberization, features increased service life and durability, and also lower and hence improved rolling resistance.

TABLE 1

| Constituents | Unit | V1 | E1 |
| --- | --- | --- | --- |
| Natural polyisoprene | phr | 80 | 80 |
| Polybutadiene | phr | 20 | 20 |
| Silica $^{a)}$ | phr | 60 | 60 |
| Process auxiliary + plasticizer $^{b)}$ | phr | 7.5 | 7.5 |
| TESPT silane | phf | 8.6 | — |
| Silane B, formula II) $^{c)}$ | phf | — | 11.4 |
| Aging stabilizer | phr | 4 | 4 |
| Zinc oxide | phr | 8 | 8 |
| Accelerator | phr | 1.5 | 1.5 |
| Sulfur | phr | 4.3 | 4.3 |
| Cobalt salt $^{d)}$ | phr | 0.4 | 0.4 |
| Reinforcer resin | phr | 5 | 5 |
| Mooney viscosity | Mooney units | 69 | 56 |
| Resilience at RT | % | 44 | 45 |
| Tensile strength 100° C. | % | 100 | 120 |
| Elongation at break 100° C. | % | 100 | 118 |
| E'(0.15%)-E'(8%) DKF 55° C. | MPa | 7.6 | 5.7 |
| tan d (max.) 55° C. | MPa | 0.129 | 0.121 |
| Pullout force | % | 100 | 102 |
| Coverage | % | 100 | 95 |

The invention claimed is:

1. A sulfur-crosslinkable rubber mixture comprising at least the following constituents:
   50 to 100 phr of at least one polyisoprene selected from the group consisting of natural and synthetic polyisoprene and
   5 to 500 phr of at least one silica and
   2.5 to 8 phr of sulfur and
   at least one silane B having the general empirical formula I)

$$(R^1)_oSi-R^2-S_n-R^2-Si(R^1)_o \qquad I)$$

where the two o may independently be the same or different and each assume a value of 1, 2 or 3 and $R^1$ may independently be the same or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or
   alkyl polyether groups $-O-(R^6-O)_r-R^5$ where $R^6$ are the same or different and are branched or unbranched, saturated or unsaturated, aliphatic, aromatic or mixed aliphatic/aromatic bridging $C_1$-$C_{30}$ hydrocarbon groups, r is an integer from 1 to 30, and $R^5$ is unsubstituted or substituted, branched or unbranched, terminal alkyl, alkenyl, aryl or aralkyl groups,
   or
   two $R^1$ form a cyclic dialkoxy group having 2 to 10 carbon atoms, in which case o<3,
   or two or more silanes of formula I) may be bridged via $R^1$, and
   in formula I), in each $(R^1)_oSi-$ group, $R^1$ i) is bonded to the silicon atom via an oxygen atom or ii) is a halide;
   and $R^2$ may independently be the same or different and are unbranched alkylene groups having 6 to 20 carbon atoms,
   and where n is an integer from 2 to 10.

2. The rubber mixture of claim 1, wherein $R^2$ is the same on either side and is a $-(CH_2)_8-$ group.

3. The rubber mixture of claim 1, wherein, in each $(R^1)_oSi-$ group, at least one $R^1$ is an alkoxy group having 1 to 10 carbon atoms.

4. The rubber mixture of claim 1, wherein o is 3 on either side of the silane B.

5. The rubber mixture of claim 1, wherein all $R^1$ are the same and are alkoxy groups having 1 to 3 carbon atoms on either side of the silane B and within an $(R^1)_oSi-$ group.

6. The rubber mixture of claim 5, wherein all $R^1$ on either side of the silane B and within an $(R^1)_oSi-$ group are the same and are ethoxy groups.

7. The rubber mixture of claim 1, wherein n is an integer from 2 to 8.

8. The rubber mixture of claim 1, wherein the silane B has the following structure of formula II):

$$(EtO)_3Si-(CH_2-)_8S_4-(CH_2-)_8Si(EtO)_3 \qquad II)$$

where EtO represents ethoxy group.

9. The rubber mixture of claim 1, wherein the silane B has the following structure of formula III):

$$(EtO)_3Si-(CH_2-)_8S_2-(CH_2-)_8Si(EtO)_3 \qquad III)$$

where EtO represents ethoxy group.

10. The rubber mixture of claim 1, wherein the mixture contains 0.5 to 30 phf of silane B.

11. The rubber mixture of claim 1, wherein the mixture is incorporated with strength members and contains a bonding system that binds the rubber mixture to the strength members, the strength members being textile or metallic strength members.

12. The rubber mixture of claim 11, wherein:
the strength members are steel cord, and the bonding system includes one or more cobalt salts in an amount from 0.1 phr to 3 phr; and
the sulfur is present in an amount from 3.5 phr to 5 phr.

13. The rubber mixture of claim 1, wherein
the $R^6$ is $CH_2$—$CH_2$—,
r is an integer from 3 to 10,
$R^5$ is a —$C_{13}H_{27}$ alkyl group,
$R^2$ have 6 to 10 carbon atoms.

14. A vulcanizate obtained by the sulfur vulcanization of at least one rubber mixture comprising:
50 to 100 phr of at least one polyisoprene selected from the group consisting of natural and synthetic polyisoprene and
5 to 500 phr of at least one silica and
2.5 to 8 phr of sulfur and
at least one silane B having the general empirical formula I)

$(R^1)_oSi—R^2—Sn—R^2—Si(R^1)_o$   I)

where the two o may independently be the same or different and each assume a value of 1, 2 or 3 and $R^1$ may independently be the same or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or
alkyl polyether groups —O—$(R^6$—$O)_r$—$R^5$ where $R^6$ are the same or different and are branched or unbranched, saturated or unsaturated, aliphatic, aromatic or mixed aliphatic/aromatic bridging $C_1$-$C_{30}$ hydrocarbon groups, r is an integer from 1 to 30, and $R^5$ is unsubstituted or substituted, branched or unbranched, terminal alkyl, alkenyl, aryl or aralkyl groups,
or
two $R^1$ form a cyclic dialkoxy group having 2 to 10 carbon atoms, in which case o<3,
or two or more silanes of formula I) may be bridged via $R^1$, and
in formula I), in each $(R^1)_oSi$— group, $R^1$ i) is bonded to the silicon atom via an oxygen atom or ii) is a halide;
and $R^2$ may independently be the same or different and are unbranched alkylene groups having 6 to 20 carbon atoms,
and where n is an integer from 2 to 10.

15. The vulcanizate of claim 14, the vulcanizate is a component of a tire.

16. The vulcanizate of claim 14, wherein the sulfur is present in an amount from 3.5 to 8 phr.

* * * * *